United States Patent [19]

Egres, Jr. et al.

[11] Patent Number: 5,391,709
[45] Date of Patent: Feb. 21, 1995

[54] PURIFICATION PROCESS OF PTFE USING FIBER BED AND HEATED AIR

[75] Inventors: Ronald G. Egres, Jr., Dewitt, Mich.; Clay W. Jones, Washington; John F. Kline, Jr., Parkersburg, both of W. Va.

[73] Assignee: E. I. Du Pont de Nemours and Company, Wilmington, Del.

[21] Appl. No.: 154,218

[22] Filed: Nov. 17, 1993

[51] Int. Cl.$^6$ .............................................. C08F 6/16
[52] U.S. Cl. ................................................... 528/483
[58] Field of Search ................ 528/483; 526/250, 289, 526/483

[56] References Cited

U.S. PATENT DOCUMENTS 3,464,964  9/1969  Black ................................... 528/483

Primary Examiner—Joseph L. Schofer
Assistant Examiner—Tom Weber
Attorney, Agent, or Firm—Edwin Tocker

[57] ABSTRACT

Polytetrafluoroethylene coagulate obtained from aqueous dispersion polymerization of tetrafluoroethylene in the presence of volatile initiator, surfactant, and possibly wax, is purified of these contaminants by exposing the coagulate to heated air with the coagulate being formed as a shallow bed on a fabric of polymer filament, the heated air passing through the bed from top to bottom to volatilize the contaminants including the water content of the coagulate and thereby cause them to leave the bed through openings in the fabric.

9 Claims, No Drawings

PURIFICATION PROCESS OF PTFE USING FIBER BED AND HEATED AIR

BACKGROUND OF THE INVENTION

This invention relates to the purification, including drying, of polytetrafluoroethylene of the type prepared by aqueous dispersion polymerization of tetrafluoroethylene.

Polytetrafluoroethylene (PTFE) prepared by aqueous dispersion polymerization in the presence of initiator and surfactant and possibly wax adjuvant is coagulated to form a coagulate of small particles having a diameter on the order of 10–1000 microns. This coagulate, after separation from the bulk of the water, is still contaminated with water, polymerization initiator, surfactant and such other ingredients such as wax, if present. These contaminants have to be removed to the extent that the resultant PTFE fine powder is useful for fabrication into defect-free articles.

Heretofore the PTFE coagulate has been purified by applying it as a shallow bed on the surface of a special paper made of plant fibers and exposing this shallow bed to a flow of heated air, e.g. at least 160° C., through the thickness of the bed, from top to bottom, whereby the contaminants described above volatilize and exit the bed as vapors though openings in the paper at the bottom of the bed, followed by removal of the resultant PTFE fine powder from the surface of the paper. The particles readily separate from the paper surface, leaving behind the paper, itself now contaminated by absorption of at least some of the contaminants, notably surfactant and initiator. Such paper cannot be re-used because of inability to withstand multiple cycles of exposure to the hot air and the problem of the contaminated paper re-contaminating a second batch (bed) of PTFE placed on the paper for purification. Thus, the present process has the problems of cost in continuously replacing the paper support for new batches of PTFE to be freed of contamination and the expense of special precautions being necessary for disposal of the contaminated paper.

SUMMARY OF THE INVENTION

The present invention solves this problem by applying the polytetrafluoroethylene (PTFE) coagulate which contains volatile contaminants comprising water, polymerization initiator, surfactant and optionally, wax, as a shallow bed on the surface of a fabric, exposing the shallow bed to flow of heated air through the thickness of the bed from top to bottom to volatilize said contaminants, said fabric comprising polymer at least at its surface and being thermally and dimensionally stable at the temperature of the heated air, said fabric having openings therein to permit the passage of said air and volatilized contaminants, thereby removing said contaminants from said bed to thereby form PTFE fine powder from said coagulate, the openings in the fabric not permitting the passage of said fine powder therethrough, and removing the fine powder from said surface.

The fabric forming the surface for this purification process does not absorb the contaminants and because of its heat resistance, is reusable for purification of subsequent charges of PTFE coagulate, thereby saving disposal cost.

DETAILED DESCRIPTION

The process of polymerizing PTFE in an aqueous dispersion in the presence of initiator and surfactant and such other ingredients as wax which serves as an adjuvant to the polymerization process and recovery of PTFE coagulate from the resultant emulsion of PTFE particles and coagulating this dispersion is conventional. The PTFE coagulate will normally contain at least about 30% water, at least about 0.0001% polymerization initiator such as ammonium persulfate, and at least about 0.0005% surfactant such as ammonium perfluorooctanoate, all %s being based on the weight of the coagulate. Additional contaminant may be present such as wax in an amount such as at least about 0.005 wt %.

The PTFE of the coagulate and fine powder obtained therefrom can be polytetrafluoroethylene homopolymer or copolymer of tetrafluoroethylene with small amounts of one or more copolymerizable comonomers as are well known in the art, such as hexafluoropropylene, perfluoro(alkyl vinyl ether) wherein the alkyl group contains from 1 to 5 carbon atoms, preferably 3 carbon atoms, and perfluorobutyl ethylene, to nevertheless provide non-melt fabricable polymer.

In accordance with the present invention the paper formerly used to support the PTFE coagulate during purification is replaced by the fabric described above.

The fabric can be in such form as the liner of a perforated pan used for tray drying in an oven or as a continuous belt operating within an oven, in which case the process steps are carried out continuously, i.e., continuously applying the coagulate at one end of the path of the belt, continuously removing the purified PTFE fine powder from the opposite end of the path of the belt, and continuously exposing the shallow bed of coagulate to the heated air as it passes along the path from the one end to the opposite end. In either form, the fabric is the immediate support for the coagulate and can be re-used for purifying additional polymer.

The fabric can be on any construction, e.g. knit, spunbonded, or woven, which provides the dimensional integrity needed, depending on the form of the fabric used. The fabric will be made of yarn in the case of knit or woven constructions and generally fibers in the spunbonded construction. The yarn or fibers making up the fabric, as the case may be provide openings between the yarn or fibers making up the fabric for passage of the heated air during the purification process, while supporting the PTFE coagulate/fine powder particles thereon, i.e., the openings do not permit the PTFE fine powder to pass therethrough. While the openings in the fabric should be small in order to hold the PTFE fine powder, such openings should also be large enough to permit the passage of the heated air and contaminants volatized thereby at a sufficient rate to result in a reasonable time for exposure to the hot air to effect the purification. Unduly extended exposure may cause decomposition of and or interaction between contaminants either within the bed of coagulate/fine powder or on the surface of the fabric, which manifests itself as "spotting" or discoloration of the PTFE fine powder present on the fabric either at that time or at a later time. Thus it is preferred that the fabric permit an air flow of at least about 75 CFM (0.021 m$^3$/min), preferably at least 100 CFM (0.28 m$^3$/min). Air flows up to about 200 CFM (0.057 m$^3$/min) can be used without particles from the coagulate or the resultant fine powder falling through or becoming lodged in the openings in the fabric. The air flows through the fabric disclosed herein are determined by the permeability procedure of ASTM-D737 at a pressure differential of 0.5 in (1.27 cm) of water across the thickness of the fabric.

While PTFE is known for its non-stick property, in the form of coagulate and the fine powder obtained therefrom, the polymer is notoriously sticky possibly because of the fibrillar nature of this form of PTFE. When the support surface for the coagulate is metal such as stainless steel, exposure of the coagulate to heated air to remove contaminants causes the resultant PTFE fine powder to adhere tenaciously to the metal surface even when it is in the form of a perforated plate which presents a smooth surface to the bed of PTFE coagulate. This experience would suggest that a fabric which by its nature tends to present a non-smooth surface to the PTFE coagulate would obtain the same result.

Surprisingly, the PTFE fine powder resulting from the purification process essentially does not stick to the polymer surface of the fabric. The PTFE fine powder is readily removable therefrom by gravity, i.e., turning the tray upside down causes the PTFE particles to fall away from the fabric. In the case of the fabric being a continuous belt, passage of the fabric (belt) around a small diameter roll, e.g. 5 cm in diameter, causes the particles of PTFE to fall away from the belt. Should a few particles stay behind on the belt, possibly because of fibrils of the particles mechanically engaging the openings in the fabric, removal can be assisted by a vacuum of the bed side of the belt and air knife on the underside of the belt aimed at the vacuum collection area. Thus, a clean fabric is presented to new charges of PTFE coagulate applied thereon for purification. Easy removal of the PTFE fine powder from the fabric surface is important so that the powder is not subject to shear during such removal; shear of the particles at this point in their processing would adversely affect subsequent processing and properties of product fabricated therefrom.

The yarn of the fabric is preferably made of filaments rather than fibers so as to contribute to the cleanliness of the fabric by it not serving as a source of contamination of the PTFE fine powder, e.g. there are no fibers to separate from the yarn to become part of the PTFE fine powder and product fabricated therefrom. Fabric made of fiber yarn, however, can be given filamentary character by application of a continuous coating of thermally stable polymer. Spunbonded fabric made from polymer fibers can be hot calendared to cause compression of the thickness of the fabric and the entangled fibers to become further anchored within the fabric by bonding together, to provide a non-contaminating fabric useful in the present invention.

The thermal and dimensional stability of the filaments or fiber making up the fabric is available from such polymers as tetrafluoroethylene (TFE) polymer, polyetherether ketone (PEEK), polyphenylene sulfide (PPS), and aramid such as poly(m-phenyleneisophthalamide), and poly(p-phenyleneterephthalamide). Examples of the TFE polymers are PTFE as described above with respect to the polymerization process and resultant coagulate and high melting but melt-fabricable tetrafluoroethylene polymers which can be copolymers of TFE with one or more of the monomers mentioned above in sufficient amount to provide the melt-fabricable character. For low temperature purification operation, e.g. 160° C., lower melting TFE polymer can be used, such as TFE/ethylene polymer; an additional low melting polymer that could be used is ethylene/chlorotrifluoroethylene polymer.

The filaments from which the fabric can be made can be made of non-polymeric material such as glass fiber yarn, which is thermally and dimensionally stable, with the fabric or yarn being coated with a continuous coating of thermally stable polymer to give not only filamentary character to the glass fiber yarn making up the fabric, but polymer character as well. In this embodiment, the demands of thermal and dimensional stability for the polymer can be somewhat less than if the polymer made up the entire fabric.

The reference to the fabric herein being made of polymer filaments thus contemplates such filaments being composites of fibers, polymeric and non-polymeric, with a polymer coating, as well as polymer filaments which are made entirely of polymeric filamentary material. The presence of the continuous coating of polymer making up the composite filament means that the coating on the filament is continuous, but not that the openings in the fabric are closed by the polymer coating.

The thermal stability of the polymer or any other material used to make the fabric should exist at the temperatures of exposure of the fabric to the heated air, such temperatures being usually within the range of 110° to 200° C., preferably 160° to 200° C. By thermal and dimensional stability is meant that the fabric does not soften or melt or decompose, but does retain its size and shape. When the fabric is made entirely of polymer, whether polymer fiber, polymer coated fiber yarn or polymer yarn of one or more filament, then the polymer must exhibit this dimensional stability. Temperatures at which the fabric and/or the polymer in the fabric are thermally and dimensionally stable can be considered the use temperature thereof. Preferably, the melting point of the polymer and its use temperature should be at least 220° C. PTFE and PPS are preferred because of ready availability in filamentary form for fabrication into fabric. It is surprising that fabric of TFE polymer can be used without the PTFE particles from the coagulate or the resultant fine powder sticking to the fabric, because PTFE is known to stick to PTFE and the PTFE particles are sticky themselves. When the TFE polymer is selected for coating a fabric made of fiber yarn, the polymer can be melt-fabricable TFE polymer; PTFE aqueous dispersion can also provide a continuous coating of polymer.

The process of the present invention is conducted by forming a shallow bed of the PTFE coagulate on the fabric surface. Generally the thickness of the bed will range from 0.5 to 4 cm. depending on the temperature of the heated air being used. The bed should not be too thin because that would adversely affect production rate and increase cost, and not too thick because that increases the time needed for volatilization of the contaminants and risks interactions and discolorations described above. These thicknesses afford relatively easy passage of the heated air and volatiles through the bed in the direction from top to bottom.

The heated air is directed against the top surface of the bed, preferably over its entire surface whether the bed (and fabric support) is stationary as in a tray dryer or moving as in the case of a continuous belt. This manner of exposure of the bed to heating causes the air flow to be in the direction from the top to the bottom of the bed and out through the openings in the fabric. The contaminants volatilizing at the temperatures used, developing within the bed, follow the same path. The flow of heated air thus carries off the volatiles from the bed. The time of exposure will be that which is effective for the particular bed thickness, temperature and air flow that is used to effect substantially complete removal of the water and surfactant. Exposure times of 10 to 20 minutes may be all that is necessary.

The amount of air flow will be adjusted for the particular temperature and bed thickness used to cause the water and other contaminants to volatilize simultaneously, rather than permitting the water to be driven off from the bed prior to volatilizing the contaminants, because sequential volatilization tends to leave an unacceptable amount of other contaminants behind in the PTFE fine powder, which persists in the powder even after further exposure to heated air. Simultaneous volatilization means that water and other contaminants are volatilizing at the same time, but it is not believed that water vapor must be present at the end of the volatilization of all the other contaminants. In addition, because of the relatively large amount of water present and its lower boiling point than the vaporization temperature of at least some of the other contaminants, some amount of water may volatilize prior to the other contaminants starting to volatilize. Thus, the drying of the PTFE fine powder which results from the purification process of the present invention is only part of the overall process.

The resultant PTFE fine powder will generally have a water content of less than 0.05 wt %, surfactant content of less than 10 ppm, based on the total weight of the PTFE fine powder, and an initiator and wax content which is so small as to be virtually undetectable.

By way of example, the purification process can be practiced in a tray dryer heated to 190° C., wherein a bed of PTFE coagulate having the initiator, surfactant, and wax impurities described hereinbefore is formed to a depth of 5 to 10 mm on a test fabric which is supported on a metal perforated tray. Air heated at 190° C. is directed perpendicularly at the entire top of the bed for about 20 minutes to obtain the purity hereinbefore described. The resultant PTFE fine powder is easily removed from the fabric by just turning the tray upside-down.

This procedure has been practiced on a number of fabrics having permeabilities from 0.028 m³/min to 0.057 m³/min, made from a number of different materials, e.g. PTFE, PPS, PEEK, and Nomex® aramid fiber in the form of hot calendared spunbonded fabric available as type 309H, all with the aforesaid purification result and with the fabrics withstanding repeated purification cycles and being free of contaminants even after repeated cycles. In particular, the PPS fabric was 0.157 cm thick, was made of PPS filaments, 30 yarns/2.54 cm in the machine direction and 33 yarns/2.54 cm in the cross direction, with the machine direction yarn have a crosssection measuring 0.5×0.88 mm (thickness and width) and the cross machine yarn having a 0.66 mm diameter.

The purification procedure has also been practiced using fabric as support for PTFE coagulate in a continuous dryer under similar conditions as in the tray dryer and for about the same amount of exposure to the heated air to obtain equivalent purification results.

What is claimed is:

1. Process for purification of a polytetrafluoroethylene coagulate which contains volatile contaminants comprising water, polymerization initiator, and surfactant, and optionally, wax, comprising applying said coagulate as a shallow bed on the surface of a fabric, exposing the shallow bed to a flow of heated air through the thickness of the fabric in the direction from the top of the bed to its bottom to volatilize said contaminants, said fabric comprising polymer at least at its surface and being thermally and dimensionally stable at the temperature of the heated air, said fabric having openings therein to permit the passage of the heated air and volatilized contaminants, thereby removing said contaminants from said bed to thereby form PTFE fine powder from said coagulate, the openings in said fabric not permitting the passage of said fine powder therethrough, and removing the resultant purified fine powder from said surface.

2. The process of claim 1 wherein the said polymer is selected from the group consisting of tetrafluoroethylene polymer, polyphenylene sulfide, or polyetherether ketone.

3. The process of claim 1 wherein said polymer is in the form of filament yarn.

4. The process of claim 1 wherein said polymer is in the form of continuous coating on fiber yarn.

5. The process of claim 1 wherein said fabric is spunbonded and hot calendared.

6. The process of claim 5 wherein said fabric is formed from aramid fiber.

7. The process of claim 1 wherein said fabric is in the form of a continuous belt, and the applying, exposing, and removing process steps are carried out continuously.

8. The process of claim 1 wherein the temperature of the heated air is 110 to 200° C.

9. The process of claim 8 wherein the polymer has a use temperature of at least 220° C.

* * * * *